No. 877,680. PATENTED JAN. 28, 1908.
W. G. TEMPLETON.
SCALE.
APPLICATION FILED SEPT. 20, 1906.
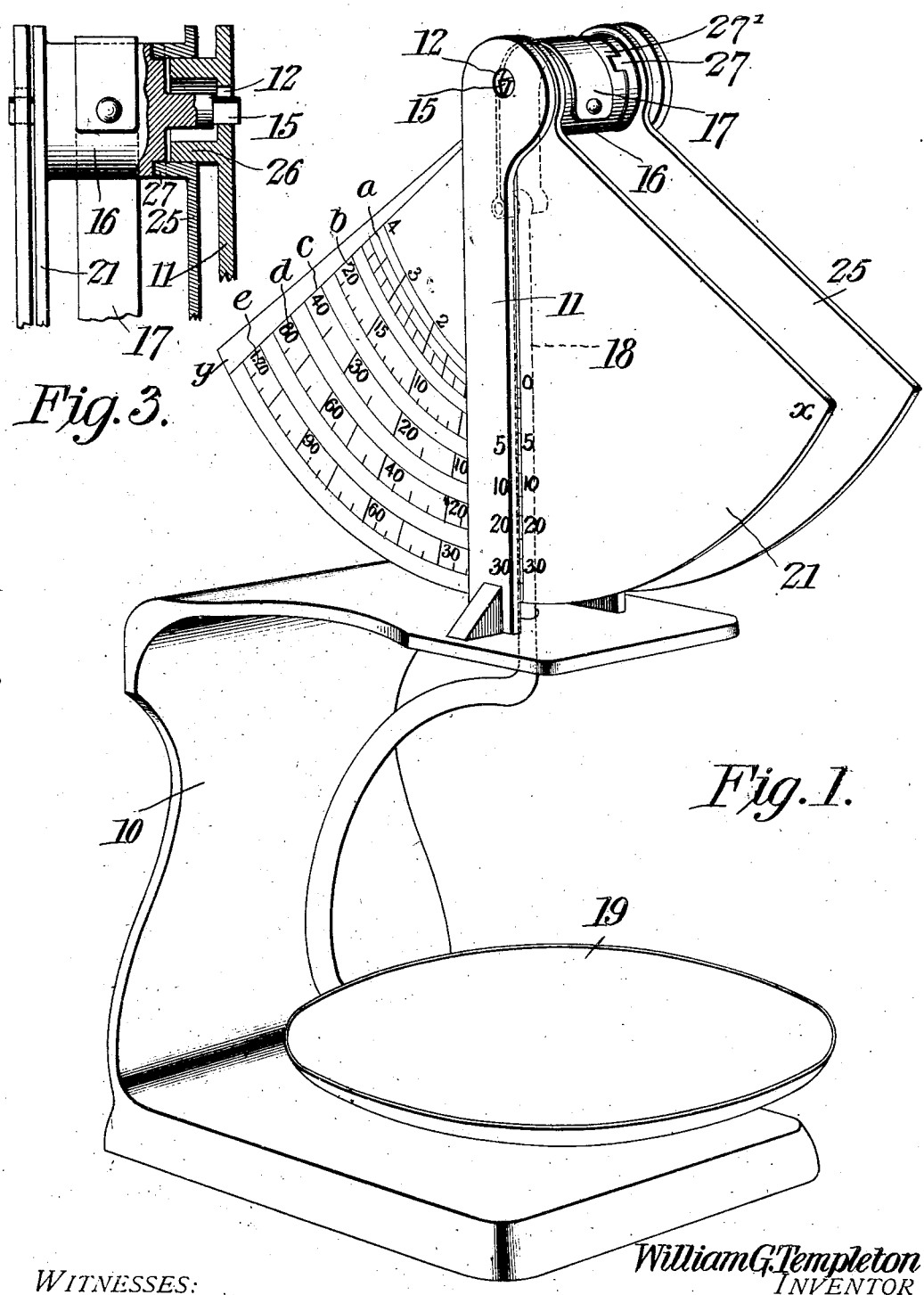

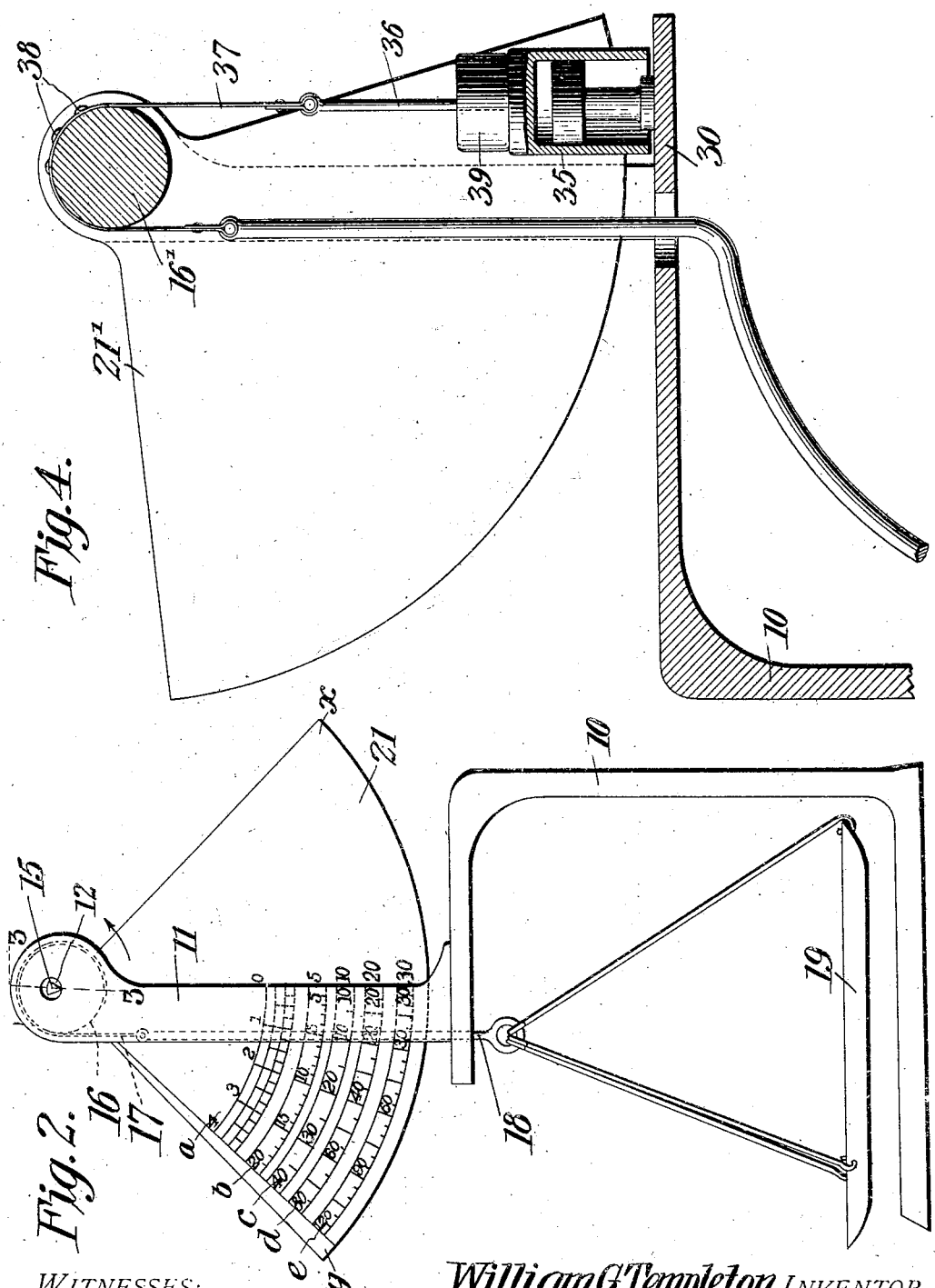

UNITED STATES PATENT OFFICE.

WILLIAM G. TEMPLETON, OF COLORADO SPRINGS, COLORADO.

SCALE.

No. 877,680.  Specification of Letters Patent.  Patented Jan. 28, 1908.

Application filed September 20, 1906. Serial No. 335,458.

*To all whom it may concern:*

Be it known that I, WILLIAM G. TEMPLETON, a citizen of the United States, residing at Colorado Springs, in the county of El Paso and State of Colorado, have invented a new and useful Scale, of which the following is a specification.

This invention relates to weighing scales and has for its principal object to provide a scale of the calculating or other type in which the indicating graduations or tables may be plainly read and in which there will be no necessity for reducing the distance between the graduations in the higher reading as it is usual in scales of the pendulum or pointer type.

A further object of the invention is to provide a weighing scale in which the descent of the scale pan or load receiver under the influence of the load is resisted by a segment that receives angular movement to an extent proportioned to the weight of the load and which bears graduations indicating weights, values, or the like, such graduations being so arranged so to permit ready and accurate reading.

A still further object of the invention is to provide a scale of the pivoted indicator type in which provision is made for coupling on an additional element or elements to resist the descent of the load receiver and thus add to the weighing capacity of the scale.

Still further objects of the invention are to improve, simplify, and cheapen the construction of scales of this type and generally to add to their effectiveness and durability.

With these and other objects in view, as will more fully hereinafter appear, the invention consists in certain novel features of construction and arrangement of parts, hereinafter fully described, illustrated in the accompanying drawing, and particularly pointed out in the appended claims, it being understood that various changes in the form, proportions, size and minor details of the structure may be made without departing from the spirit or sacrificing any of the advantages of the invention.

In the accompanying drawings: Figure 1 is a perspective view of a weighing scale constructed in accordance with the invention. Fig. 2 is a side elevation of the same. Fig. 3 is an elevation, partly in section, on the line 3—3 of Fig. 2, showing the clutch for coupling on an additional segment. Fig. 4 is a sectional view illustrating a modification of the invention.

Similar numerals of reference are employed to indicate corresponding parts throughout the several figures of the drawing.

The scale frame 10 carries a pair of vertically disposed standards 11 having openings 12 for the reception of knife edge fulcrums 15 which project from the opposite ends of a drum 16. To the drum is secured one end of a flexible member 17 which may be in the form of a chain or band, the opposite end of said member being connected to the suspension rod 18 of a scale pan or load receiver 19. Any weight placed in the scale pan will cause rotative movement of the drum in the direction indicated by the arrow.

Secured to the drum is a segmental plate 21 which in the present instance is in the form of a quadrant, the vertical plane of the center of gravity of which is midway between the ends of the segment and in the vertical plane of the knife edge fulcrums 15. One edge of the standard 11 is also in the vertical plane of the knife edge fulcrums and forms the sighting point in reading the graduations. The standard is further provided with indicating marks or symbols designating rates or the like to be used in reading values on the scale. The segment must resist the weight of the load receiver and ordinarily would be thrown about two degrees to the right, but this is compensated for in the adjustment of the parts so that the central line of the segment, at zero position, is in the vertical plane of the knife edge fulcrums.

The segment is provided with a series of graduations, of which the upper series *a* may indicate weights in pounds and fractions thereof, while the remaining graduations *b*, *c*, *d* and *e* may be used to indicate values where the goods sold are worth five cents, ten cents, twenty cents, or thirty cents per pound. These graduations or their arrangement, however, for either weight or computing, form no part of the present invention, except in so far as the spacing of each set of graduations are concerned.

It is well known that in that class of scales known as pendulum scales, where a pendulum or like member is moved from a vertical position through an angular distance corresponding to the weight of the load, that the pendulum offers gradually increased resistance the farther it is moved from the center of gravity, and this increase in leverage force makes it necessary to correspondingly alter the distance between the graduations of the scale in order to obtain accurate reading. Thus, for instance, a weight of one pound might move the pendulum to the extent of five degrees, but a weight of two pounds would move the pendulum through an arc less than ten degrees, so that the distance between zero and the one pound indicating graduation would be much greater than the distance between the one and two pound graduations. In the higher readings the graduations must be made so small that it becomes a matter of difficulty to ascertain the correct weight. This difficulty has been overcome in some scales by the employment of more or less complicated mechanism for insuring uniformity of spacing of the graduations, but these devices are not always accurate.

After many experiments it has been found that by employing a segmental plate either in the form of a quadrant or greater or less than a quadrant, as a resisting element or counter-poise the graduations may be made practically uniform without the employment of any auxiliary or correcting devices.

In order to double the weighing capacity of the scale, a second segment 25 may be employed, as shown in Figs. 1 and 3, this segment being hung on a tubular projection 26 on one of the standards 11 and being provided with clutch teeth 27 which may engage with similar clutch teeth 28 formed in the drum. Where the capacity of the scale is to be doubled, it is merely necessary to slide the segment 25 over until it engages the drum and the resistance of the second segment will thereupon be imposed on the weighing system and the readings should therefore be multiplied by two in order to ascertain the correct weight or in case of values, a double series of indicating marks may be provided.

In the construction illustrated in Fig. 4 the frame and standards are similar to those shown in Fig. 1. The drum 16' carries a segment 21'. In this case, however, the segment is thrown almost wholly to the left in order to increase the length of the weight or value indicating tables. The center of gravity of the segment being, therefore, to the left of and below the knife edge fulcrum, tends to force the scale pan or load receiver downward, but this downward movement is prevented and a state of equilibrium is established by a counter-poise 35 hung on a rod 36, the upper end of which is connected to a strap 37 that passes over the drum and is provided with perforations for the reception of teeth 38 projecting from said drum, the opposite end of the strap being connected to the suspension rod of the scale pan. The weight 35 is preferably in the form of an inverted cylinder which fits over a stationary piston carried by the platform 30, and constitutes a small dash pot which will prevent abrupt movement of the scale pan in either direction. This weight represents the force $x$ previously referred to, and it must be raised by the load, while the force $y$ at the left of the segment acts as before although with increased effect to correspond to the greater resistance offered by the weight 35.

When in the normal position the segment exercises its greatest force in assisting the downward movement of the scale pan or load receiver, and when any load is placed in the receiver the segment will swing toward the right until its center of gravity approaches the vertical plane of the fulcrum, the movement being resisted by the weight 35. As the segment moves to the right its effective force is of course lessened as the center of gravity swings inward, but until the center of gravity of the segment arrives in the vertical plane of the fulcrum the scale acts on the minus principle, and the graduations from zero to the center of gravity of the segment are approximately uniform. Should the weight of the load be sufficient to pull the segment beyond this point the resistance $x$ referred to in the previous example will be added to that offered by the weight 35, while the force $y$ will also act as previously described to oppose said force $x$, the effectiveness of the force $x$ gradually increasing while that of the force $y$ graually diminishes, the result being that the effective poise load opposed to the weight is the differential between forces $x$ and $y$, plus the constant force represented by the weight 35.

In order to add to the weighing capacity of the scale shown in Fig. 4, an additional weight or weights 39 may be hung on the rod 36, each weight representing of course a multiple of the original or unitary weighing value of the machine.

I claim:—

1. A weighing scale comprising a supporting frame, and a pair of standards having knife edge bearings, a drum having knife edge fulcrums mounted on said bearings, one edge of one of the standards being disposed in the vertical plane of the fulcrum and forming the reading edge of the scale, said standard being further provided with symbols representing rates, a flexible member having one end secured to the drum, a load receiver hung from the opposite end of said flexible member, a pair of segments, one of which is rigidly secured to the drum, and is provided with graduations representing weights and values, the other segment being disconnected from the drum, and means for connecting the second segment to the drum in order to double the weighing capacity of the scale.

2. A weighing scale including a frame and a pair of standards, a drum having knife edge fulcrums supported by the standards, one edge of one of the standards being disposed in the vertical plane of the fulcrum and forming the reading edge of the scale, a flexible member having one end supported by the drum, a load receiver hung from the opposite end of said flexible member, and a segment carried by the drum and provided with indicating graduations.

3. In a weighing scale, a frame including a pair of standards, a drum supported by the standards, a flexible member having one end connected to the drum, a load receiver hung from the opposite end of said flexible member, a segment carried by the drum, and forming a counter-poise of the load receiver, an auxiliary segment, and means for connecting the auxiliary segment to the drum in order to double the weighing capacity of the scale.

4. In a weighing scale, a frame including a pair of standards, a drum revolubly mounted between said standards, a flexible member having one end connected to the drum, a load receiver hung from the opposite end of said flexible member, a segmental counter-poise carried by the drum and bearing indicating graduations, the center of gravity of said segment being normally in the vertical plane of the fulcrum, an auxiliary segment, and means for connecting the auxiliary segment to the drum.

5. In a weighing scale, a frame including a pair of standards, a drum revolubly mounted between the standards, a flexible member having one end connected to the drum, a load receiver connected to the opposite end of said flexible member, a segmental counter-poise carried by the drum and provided with indicating graduations, a second segment loosely supported in alinement with the first, and clutch teeth between the drum and such second segment to permit the coupling on of the latter when the weighing capacity of the scale is to be increased.

6. A weighing scale including a frame, and a standard, a drum revolubly mounted on the standard, the standard carrying a reading edge in the vertical plane of the fulcrum, a flexible member having one end supported by the drum, a load receiver hung from the opposite end of said flexible member, and a segment carried by the drum and provided with indicating graduations.

7. A weighing scale including a drum mounted for revoluble movement, a segmental counter-poise secured to the drum and provided with indicating graduations, a load receiver, a flexible member connected at one end to the drum and at the opposite end to the load receiver, and a stationary member having a reading edge coacting with the graduations of the segment to indicate the weight of the load.

8. The combination in a weighing scale, of a revolubly mounted drum, a support therefor, a flexible member having one end supported by the drum, a load receiver hung from the opposite end of said flexible member, and a segmental counter-poise carried by and depending from the drum and provided with indicating graduations.

In testimony that I claim the foregoing as my own, I have hereto affixed my signature in the presence of two witnesses.

WILLIAM G. TEMPLETON.

Witnesses:
E. HUME TALBERT,
JNO. E. PARKER.